(12) United States Patent
Rumble

(10) Patent No.: US 8,780,207 B2
(45) Date of Patent: Jul. 15, 2014

(54) IMAGE ACQUISITION

(75) Inventor: William John Rumble, Melton Mowbray (GB)

(73) Assignee: Mark Group Limited, Leicester (GB)

( * ) Notice: Subject to any disclaimer, the term of this patent is extended or adjusted under 35 U.S.C. 154(b) by 317 days.

(21) Appl. No.: 12/865,881

(22) PCT Filed: May 11, 2009

(86) PCT No.: PCT/GB2009/001182
§ 371 (c)(1),
(2), (4) Date: Oct. 18, 2010

(87) PCT Pub. No.: WO2009/138732
PCT Pub. Date: Nov. 19, 2009

(65) Prior Publication Data
US 2011/0025851 A1    Feb. 3, 2011

(30) Foreign Application Priority Data
May 12, 2008  (GB) .................... 0808507.8

(51) Int. Cl.
*G01J 5/02* (2006.01)
*H04N 5/33* (2006.01)
*H04N 5/232* (2006.01)

(52) U.S. Cl.
CPC ... *G01J 5/02* (2013.01); *H04N 5/33* (2013.01); *H04N 5/232* (2013.01)
USPC ............................ 348/162; 348/148; 348/143

(58) Field of Classification Search
CPC ........... G01C 15/00; G01C 21/26; G01S 5/14
See application file for complete search history.

(56) References Cited

U.S. PATENT DOCUMENTS

| | | | | |
|---|---|---|---|---|
| 6,233,523 | B1* | 5/2001 | Sood | 701/409 |
| 6,946,978 | B2* | 9/2005 | Schofield | 340/995.28 |
| 2008/0265162 | A1 | 10/2008 | Hamrelius et al. | |
| 2009/0076719 | A1* | 3/2009 | Geise et al. | 701/200 |
| 2009/0240554 | A1* | 9/2009 | Oswald et al. | 705/9 |

FOREIGN PATENT DOCUMENTS

| | | |
|---|---|---|
| DE | 19929217 A1 | 2/2000 |
| DE | 19929217 A1 | 2/2004 |
| DE | 2004028736 A1 | 3/2006 |

(Continued)

OTHER PUBLICATIONS

Real-time thermal imaging of poorly insulated homes, NDT News Feed, Jun. 11, 2009.*

(Continued)

*Primary Examiner* — Jay Au Patel
*Assistant Examiner* — Reza Aghevli
(74) *Attorney, Agent, or Firm* — Wolf, Greenfield & Sacks, P.C.

(57) ABSTRACT

A computerised method of automatically acquiring a series of images, the method comprising the steps of: i) processing a data file containing a series of identifiers, each identifier corresponding to a geographic location of a property; ii) receiving location data from a geographic position sensing unit; iii) defining a camera search area (830) defined by the location data and a location of a camera relative to the location data; and iv) acquiring an image of a property when a geographic location (810*a*) of a property corresponding to one of the series of identifiers is within the camera search area (830).

17 Claims, 7 Drawing Sheets

(56) References Cited

FOREIGN PATENT DOCUMENTS

DE  1004028736 A1  6/2006
GB  2459918 B  4/2010
WO  WO 2006/090132 A3  8/2006
WO  WO 2009/074783 A1  6/2009

OTHER PUBLICATIONS

Integrated Vehicle-Based Safety Systems, U.S. Department of Transportation, National Highway Traffic Safety Administration, Oct. 2007, pp. 1-115.*

International Search Report from International Application GB0808507.8 dated Aug. 11, 2009.
"Real-time thermal imaging of poorly insulated homes" http://www.bindt.org/Content.asp?PageID=769&RSSID=4 printed Mar. 8, 2009, 2 pages.
International Preliminary Report on Patentability and Written Opinion of the International Searching Authority from corresponding PCT application GB2009/001182 dated May 11, 2009.
International Search Report from International Application GB2009/001182 filed May 11, 2009.

* cited by examiner

IMAGE ACQUISITION

The invention relates to methods and apparatus for automated image acquisition, and in particular to ground-based imaging for use in assessment of the thermal insulative properties of buildings.

Thermal imaging is a known non-contact technique for rapidly assessing the external temperature of an object. Cameras capable of taking images in the infrared region are widely available, and are typically capable of providing an output in the form of a digital signal.

It is known to provide aerial thermal imaging maps, for example to provide an overview of heat emitted over a broad area such as over a built-up area or to identify locations of raised temperature. Individual areas, objects, people or buildings can be readily identified using various techniques involving the use of aerial thermal imaging. For mapping purposes, a thermal image can be overlaid against a known map to identify and locate relevant locations or buildings for further investigation.

It is also known to thermally image buildings from ground level, for example to assess their insulative properties and for other purposes such as to determine water leaks or electrical faults.

A problem with existing solutions, however, is that aerial imaging is expensive, and may not be possible in certain locations or during certain times. Such imaging by its nature also only provides a broad view of an area, and cannot typically provide information regarding side walls of buildings, only roofs.

A further problem is that, although thermal imaging of individual buildings can be quick, assessment of many buildings is time consuming and the quality of the results can be dependent on the operator.

It is accordingly an object of the invention to overcome the aforementioned problems with previous solutions in determining insulative properties of buildings.

In accordance with a first aspect of the invention, there is provided a computerised method for automatically determining thermal insulation properties of a building, the method comprising:
  acquiring a location of the building from a position sensing unit;
  acquiring a thermal image of an exterior view of the building;
  processing the image to identify an area of the building; and
  providing an output file comprising the location of the building and indications of the insulation properties of the area of the building.

The invention according to the first aspect may include one or more of the following advantageous features.

The output file may comprise the processed image and address information derived from the acquired location, thus enabling a ready assessment of the building's insulation to be made.

The method may comprise acquiring an external ambient temperature reading of the location, with the method including processing the image by comparing a temperature of the area of the image (e.g. a roof or a wall) with the measured external temperature and providing indications in the output file to identify whether the area has a measured temperature exceeding the ambient temperature by a predefined amount.

When comparing a temperature of the area with the external ambient temperature, the method may comprise calculating an average temperature for the area to use as the comparison.

The method is preferably repeated for a plurality of buildings, and an output file provided for each building. The steps of acquiring and processing information may be triggered automatically for each of the plurality of buildings by location information provided by the position sensing unit. The method thereby enables a large number of buildings to be automatically assessed in quick succession.

In accordance with a second aspect of the invention, there is provided an apparatus for automatically determining insulation properties of a building, the apparatus comprising:
  a position sensing unit for acquiring a location of the building;
  a thermal imaging camera for acquiring a thermal image of an exterior of the building;
  a computer connected to the position sensing unit and thermal imaging camera, the computer being configured to:
    i) acquire a thermal image from the camera;
    ii) process the image to identify one or more areas of the building deficient in insulative properties; and
    iii) provide an output file comprising indications of the insulation properties of the one or more areas of the building.

The invention according to the second aspect may include one or more of the following advantageous features.

A temperature sensor may be provided, configured and positioned to determine an external ambient temperature, the sensor being connected to the computer, which is configured to process the thermal image to identify one or more areas having a measured temperature exceeding the ambient temperature by a predetermined amount.

The computer may be configured to provide an output file comprising one of more indications of an area of the building deficient in insulative properties.

The apparatus is preferably installed in a vehicle (e.g. a van), equipped with one or more thermal imaging cameras. The vehicle may comprise a left-facing and a right-facing thermal imaging camera, each camera being connected to the computer (or to respective computers) for providing thermal images of buildings on the left and right sides of the vehicle.

The computer is preferably configured to automatically acquire and process thermal images of a plurality of buildings while the vehicle is in motion, the computer optionally being configured to automatically acquire a thermal image for each of the plurality of buildings using location information provided by the position sensing unit.

In accordance with a third aspect of the invention there is provided a computerised method of automatically acquiring a series of images, the method comprising the steps of:
  i) processing a data file containing a series of identifiers, each identifier corresponding to a geographic location of a property;
  ii) receiving location data from a geographic position sensing unit;
  iii) defining a camera search area defined by the location data and a location of a camera relative to the position sensing unit; and
  iv) acquiring an image of a property with the camera when a geographic location of a property corresponding to one of the series of identifiers is within the camera search area.

The method is preferably automatically repeated so as to acquire images of a plurality of properties having corresponding identifiers in the data file. Once the data file has been received by a system configured to perform the method, the remaining method steps can automatically proceed without further user input.

The method is preferably carried out on an image acquisition system installed on board a vehicle comprising a computer, a camera and a geographic position sensing unit, the computer being configured to receive and process the data file, continually receive location data from the geographic position sensing unit, define the camera search area based on the location data and control the camera to acquire images when a geographic location of a property corresponds to one of the series of identifiers falling within the camera search area.

The images acquired are preferably thermal images, so that thermal images are automatically acquired of a series of properties for the purposes of assessing whether certain of the properties may benefit from improved insulation.

The method may comprise the further steps of storing each acquired image with a unique identifier, which may comprise the identifier in the received data file. Additional information may also be stored with the acquired image, including one or more of the date the image was acquired, the time the image was acquired, the temperature of the external environment, the geographic location and speed of the vehicle, a quality level of the location data received when acquiring the image, a distance from the vehicle to the property, the date or time the image was reviewed, an identifier corresponding to the driver of the vehicle or an operator of the system and an identifier of the data file.

The data file may be received from a server at a location remote from the vehicle in which the system is installed. Images acquired may be transmitted back to the remote server during or after acquisition of images of properties having locations corresponding to identifiers in the received data file. The images, and optional additional data, may be stored locally to the vehicle, for example on a removable storage medium.

The camera search area is preferably defined at least in terms of a distance from the camera from which the images are acquired and a maximum field of view of the camera. The maximum field of view may be defined as a linear dimension of an area having the maximum distance as another dimension. The camera search area may be of various shapes, for example in the form of a triangle having a height equal to the maximum distance from the camera and a base width equal to the maximum field of view, with the apex of the triangle located at the camera.

In accordance with a fourth aspect of the invention there is provided a vehicle comprising an image acquisition system, the image acquisition system comprising a computer, a camera and a geographic position sensing unit,
  wherein the computer is configured to perform the method according to the third aspect by receiving and processing the data file, continually receiving location data from the geographic position sensing unit, defining the camera search area based on the location data and controlling the camera to acquire images when a geographic location of a property corresponds to one of the series of identifiers falling within the camera search area.

The vehicle may comprise a first left-facing thermal imaging camera and a second right-facing thermal imaging camera, each camera being connected to the computer for providing thermal images of buildings on the left and right of the vehicle respectively.

The computer is preferably configured to automatically acquire and process thermal images of a plurality of buildings while the vehicle is in motion.

In accordance with a fifth aspect of the invention there is provided a computer program for instructing a computer to perform the method according to the third aspect. The computer program may reside on a carrier such as computer-readable storage medium.

The invention will now be described by way of example, and with reference to the enclosed drawings in which.

Figure 1:
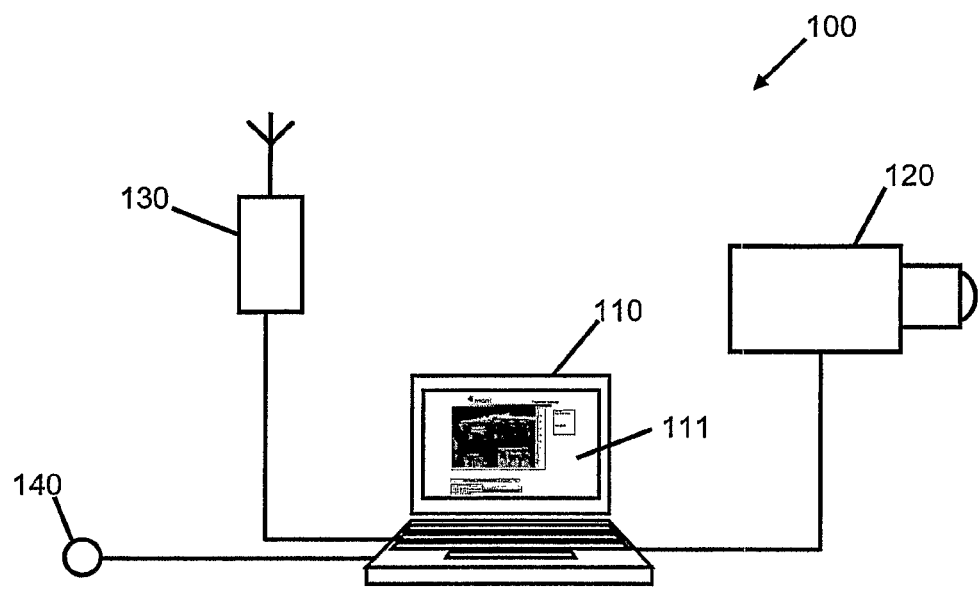
FIG. 1 shows a schematic diagram of a computerised apparatus configured to acquire and process thermal images of buildings.

FIG. 1 illustrates schematically an apparatus 100 for implementing the invention. A computer 110 is connected to a thermal imaging camera 120, a position sensing unit or location sensor 130 and a temperature sensor 140. The computer 110 may, for example, be a laptop (or notebook) type computer, or any other type suitable for mobile applications. A compact PXI-type computer is envisaged to be particularly suitable due to the ability to readily interface with other instrumentation and equipment.

The location sensor 130 preferably utilises GPS (Global Positioning System) to determine its location, although other means for determining location may alternatively be used, such as triangulation of ground-based radio signals or other satellite-based positioning systems, for example the forthcoming European Galileo satellite system, which is predicted to offer increased accuracy over the existing GPS, at least for non-military applications.

The thermal imaging camera 120 should be at least capable of accurately measuring temperature over a range of expected external ambient temperatures, such as within the range of −10 to +40° C., and is preferably able to detect temperature variations of around 1° C. or less. The camera determines the temperature by recording wavelengths within a portion of the infrared part of the electromagnetic spectrum, e.g. within the range of 5 to 15 μm. An example of a suitable camera is the A40 or P620sc type compact infrared camera available from FLIR Systems, which is capable of detecting infrared radiation over the range 7.5 to 13 μm.

The temperature sensor 140 may be a thermocouple or thermistor, which is connected to the computer for example by means of a sensing unit configured to provide a temperature reading to the computer 110.

The computer 110 is configured to communicate bi-directionally with the thermal imaging camera 120 and the location sensor 130, so as to issue controls and receive signals from each unit. Communication may be made by means of IEEE-1394, Ethernet or other types of wired or wireless links. Each thermal image from the camera 120 may be shown on a screen 111 of the computer 110 as it is acquired, or as part of a post-acquisition routine to review acquired images. Alternatively, the images are stored on a data storage medium on, or connected to, the computer 110 for future use.

Figure 2:
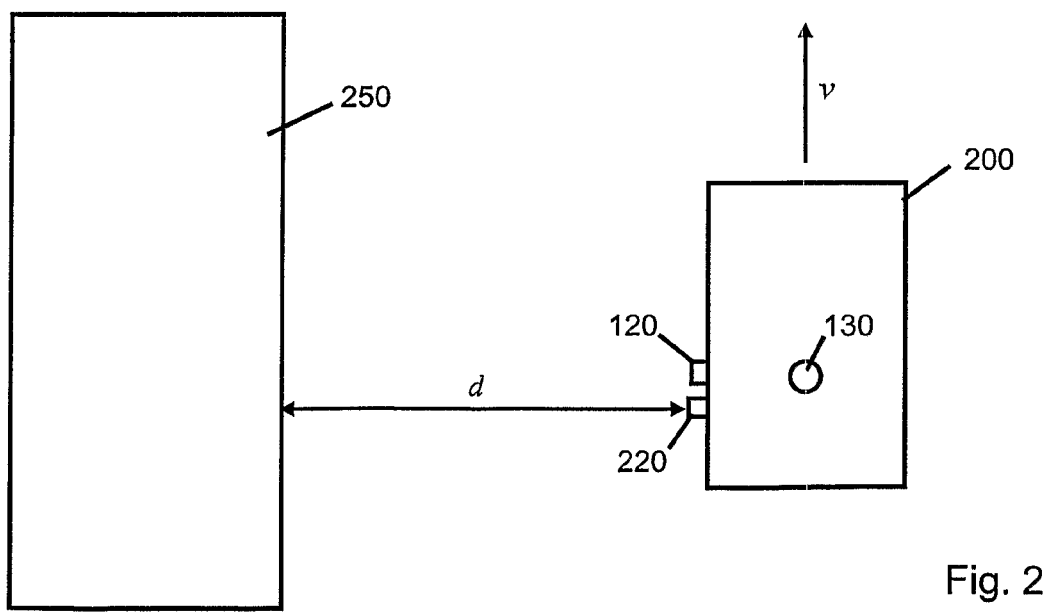
FIG. 2 shows a schematic plan view of a vehicle comprising the apparatus of FIG. 1 in position adjacent a building.

In a preferred embodiment of the invention, the apparatus 100 is installed in a vehicle 200, as shown schematically in plan view in FIG. 2. The thermal imaging camera 120, which may be mounted external to the vehicle or within the vehicle behind a transparent window, is directed away from a side of the vehicle 200 to point towards a building 250. The camera 120 captures a thermal image of the walls of the property 250 and of any visible roof area. To allow for images to be acquired from both sides of the vehicle at the same time, thermal imaging cameras may be mounted on both the left and the right sides of the vehicle 200, and controlled by a single computer, or by separate respective computers if required. An advantage of such an arrangement is that, when assessing a street having buildings on both sides, the vehicle 200 will only need to pass down the street once, thus speeding up acquisition when covering a large area.

As the vehicle 200 travels, the computer 110 is configured (i.e. programmed) to automatically acquire and process thermal images of each building 250 coming into range of the thermal imaging camera 120 while the vehicle 200 is in motion. To do this, the computer 110 needs to continuously acquire accurate location information from the position sensing unit 130 (shown in FIG. 2 installed on the roof of the vehicle 200), acquiring images from the thermal imaging camera 120 at appropriate locations. For improved accuracy, particularly in built-up areas, the computer can determine the actual location of the building 250 from the measured location of the vehicle 200 and the relative location of the building. Preferably the image and the location are determined at the same time, or sufficiently close together in time to minimise errors in determining the location. A range finder 220 may be equipped to the vehicle 200, or alternatively to the camera 120. The range finder 220 may, for example, be a laser range finder or any other suitable non-contact means of determining the distance d between the vehicle 200 and an adjacent building 250. A calculation can then be made of the location of the building 250, from the known location and orientation of the vehicle and the range of the building relative to the vehicle 200, as indicated by the distance d in FIG. 2. The orientation of the vehicle 200 can be calculated from the velocity vector v of the vehicle 200, which is typically determined continuously by the position sensing unit 130 whilst the vehicle 200 is in motion. In a general aspect therefore, a location of the building is determined from a distance acquired from a range finder in combination with a location and orientation of the position sensing unit. For example, where the velocity vector v of the vehicle 200 is defined by a magnitude V and an orientation θ, the location of a building 250 can be determined in two-dimensional Cartesian co-ordinates (with θ being measured clockwise from the y axis) by x+d cos θ, y−d sin θ, where x and y are the co-ordinates of the range finder 220, which is in a fixed relation to the position sensing unit 130.

Figure 3:
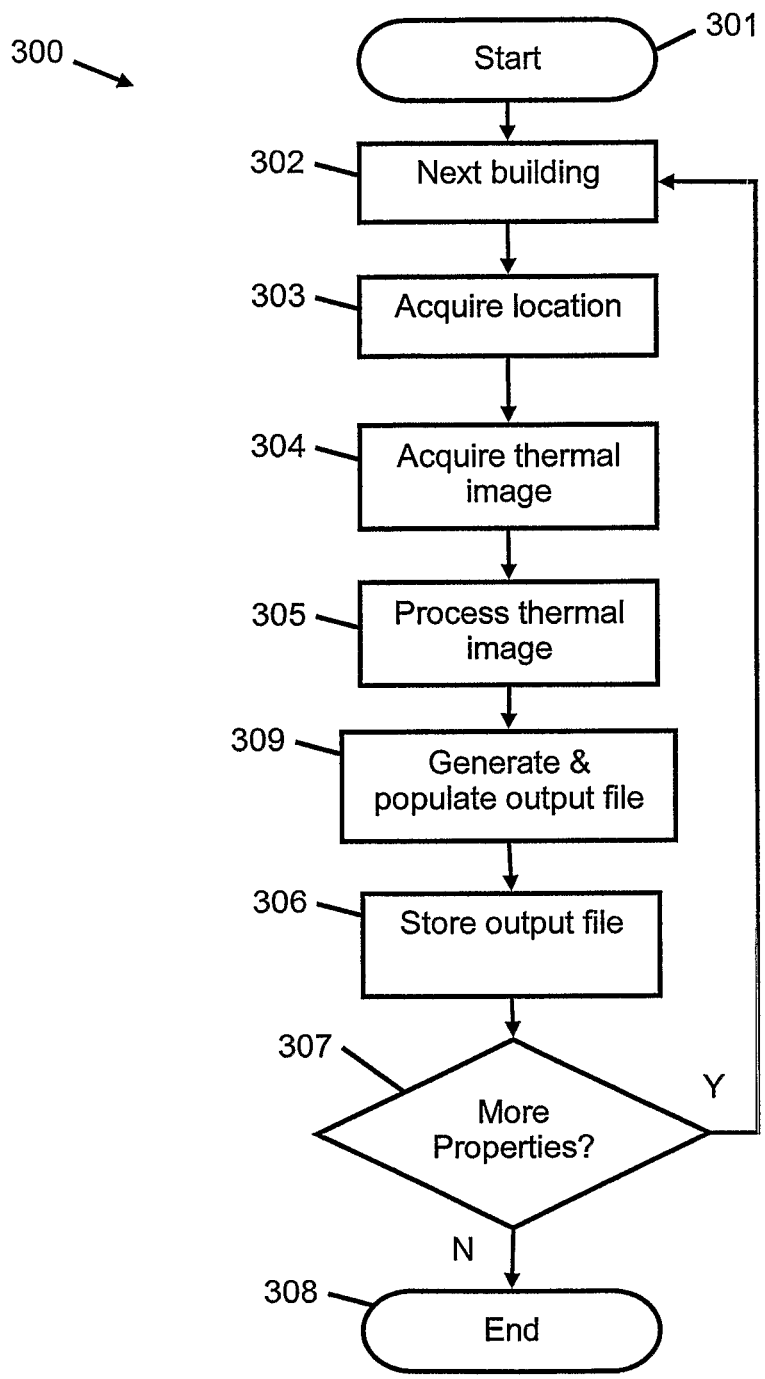
FIG. 3 shows a flow diagram of a method according to an aspect of the invention.

FIG. 3 illustrates an exemplary series of method steps 300 outlining the invention. The computer is given a start signal (step 301), and awaits the next building to come into view (step 302). This may, for example, be determined by monitoring a signal from the range finder 220 (FIG. 2), which the computer can monitor for when an object of sufficient size comes within a specified distance of the vehicle. Alternatively, the computer may have a detailed stored route map, with defined locations indicating each building along a planned route. By determining where the position sensing unit will be in relation to each building, the location of which is known, the computer can be configured to trigger the camera at predefined locations along the route. The range finder 220 may in this case be unnecessary, provided the location information is sufficiently accurate.

Once the next building is reached, the computer acquires the location of the vehicle (step 303), and acquires one or more thermal images of the building (step 304). The computer then optionally processes the image (step 305), identifying an area of the building, such as a roof or a wall, by its temperature profile. The computer then generates an output file, and populates the file with the thermal image, address information for the building and insulation status derived from the image (step 309). The output file is then stored (step 306) in a form comprising the image(s) together with the address of the pictured building and indications of the insulation properties of relevant areas of the building. If there are more buildings on the planned route (step 307), the method repeats, and if there are no more buildings on the route the method ends (step 308).

In an exemplary embodiment, the vehicle 200 travels along a street at a speed of around 10-15 miles per hour, acquiring images on both sides of the street as the vehicle passes by each building on the street. At this speed, a suitably equipped computer 110 is able to acquire and process images of buildings as they pass by, while at the same time acquiring location information from the position sensing unit and recording the information together with the acquired images in a data storage unit (e.g. a hard disk of the computer). The vehicle does not need to stop at any point during the acquisition process. In a typical built-up suburban area, over 1000 properties can be surveyed each hour by this method.

Provided location information is available with each image acquired, processing of the images need not be carried out at the time of acquisition, but could be carried out later. Processing may however be carried out simultaneously with acquisition, and files relating to each building stored as the vehicle continues along its route.

A route plan is preferably worked out beforehand, in which a number of buildings are identified for analysis. With the route plan and associated location information uploaded to the computer 110, the vehicle then travels the route plan and the computer acquires images when each location is reached, the location triggering the computer to acquire one or more images when each building is calculated to be in view. The computer may be triggered by the location reading from the position sensing unit being within a predetermined distance, e.g. a distance of a few meters, from a nominal ideal point. The images are preferably acquired during the hours of darkness, to minimise thermal effects from reflected and absorbed sunlight on buildings. It is also preferable to carry out the method during autumn or winter months, when households are more likely to have their central heating in operation, which will cause any poorly insulated areas to show up on thermal images.

Figure 4:
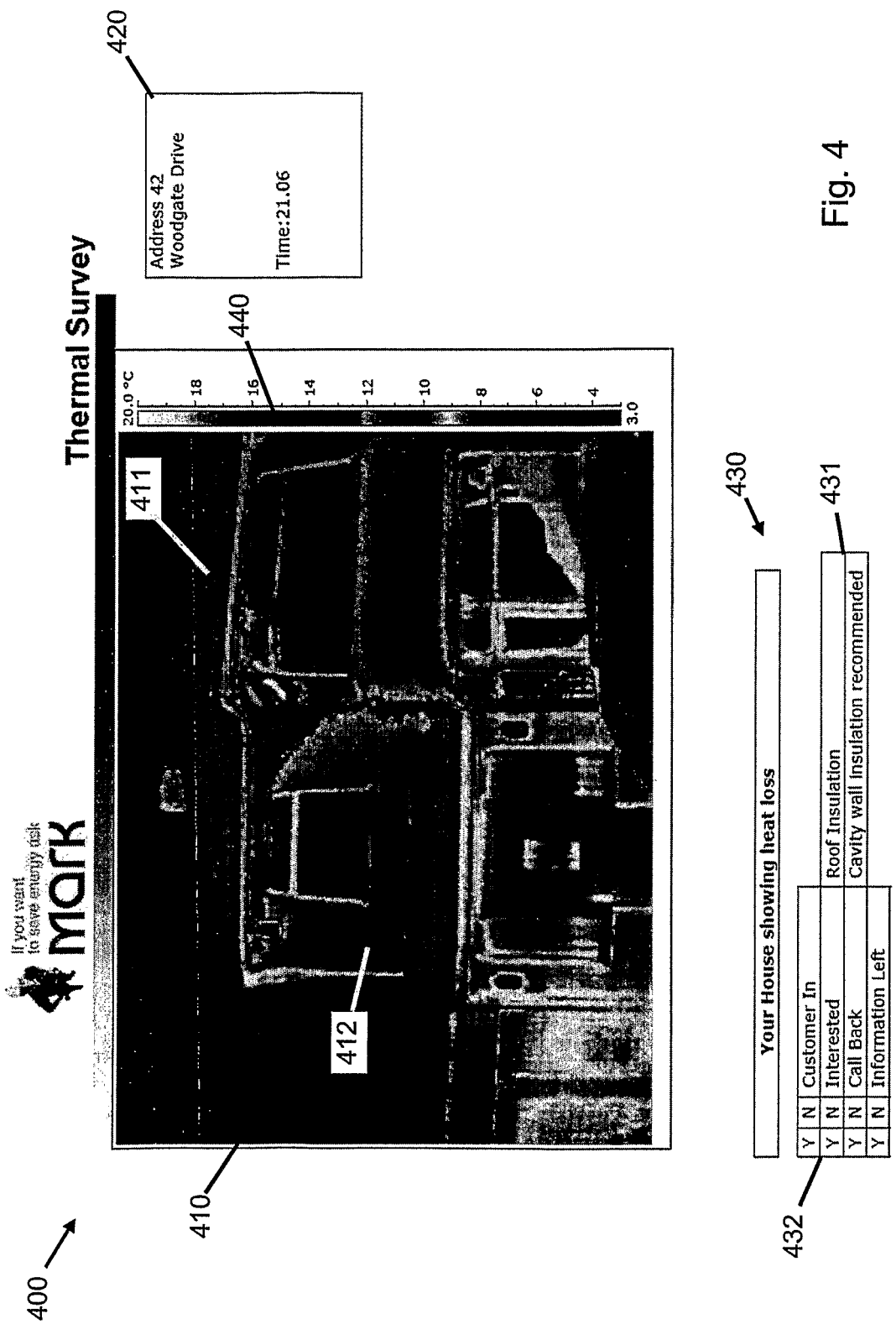
FIG. 4 shows an exemplary output file.
Figure 5:
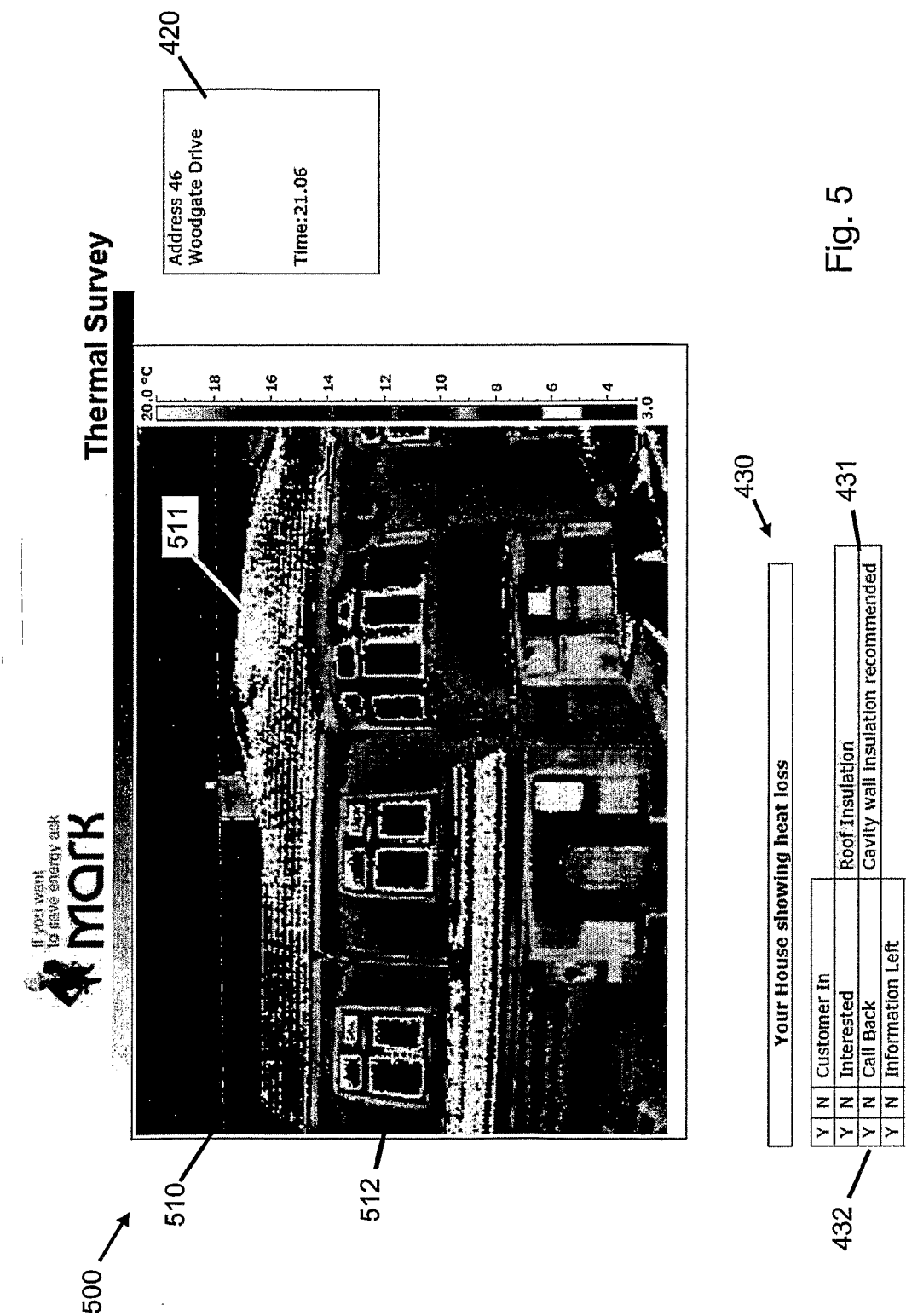
FIG. 5 shows a further exemplary output file showing a roof area identified as being deficient in insulation.
Figure 6:
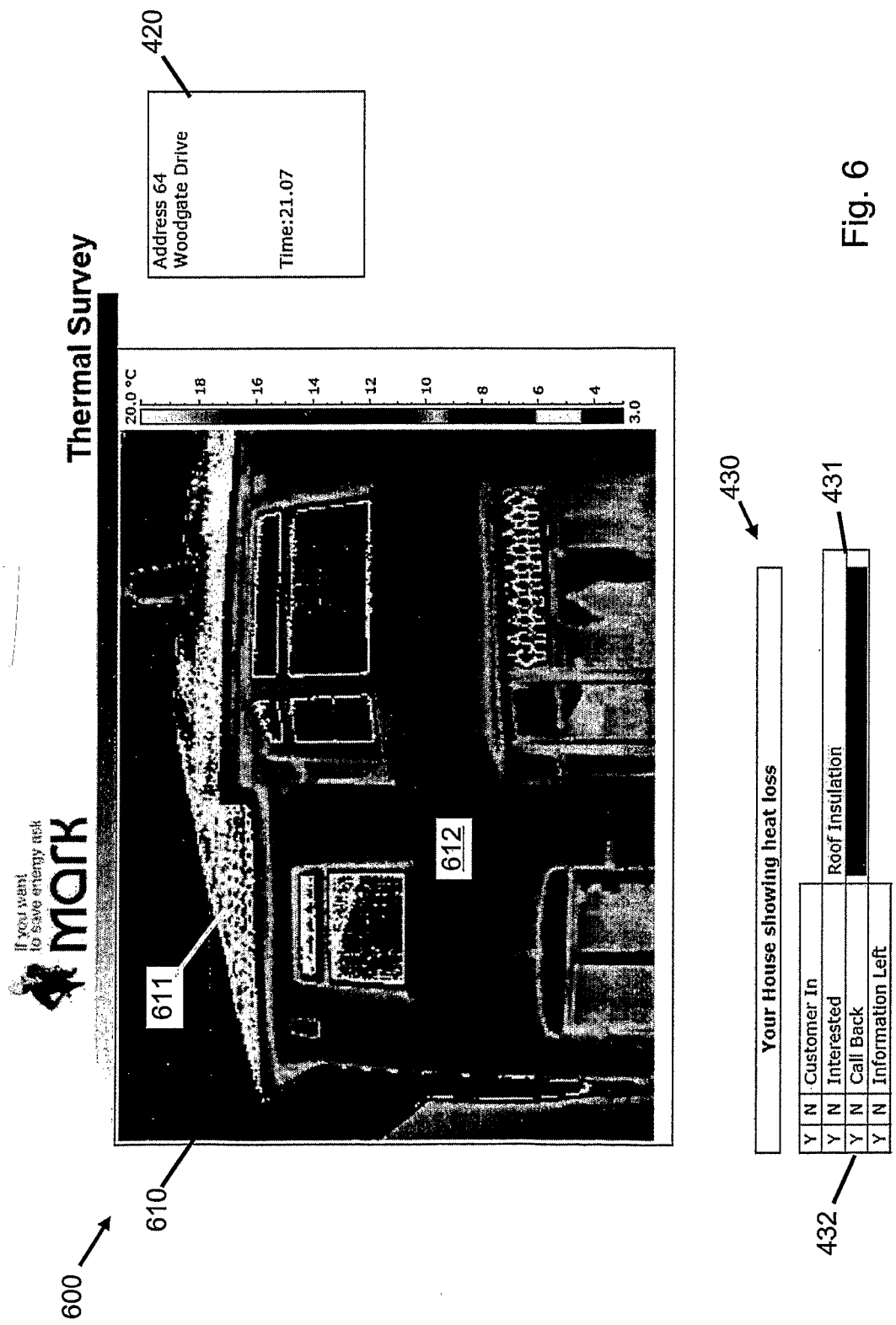
FIG. 6 shows a further exemplary output file showing a roof area and wall area identified as being deficient in insulation.

Exemplary images as part of processed output files acquired from an apparatus according to the invention are shown in FIGS. 4 to 6. FIG. 4 shows a typical output file 400 comprising an image 410 of a house having adequate insulation, determined by a measured average temperature of the roof area 411 and the wall area 412. A reference temperature scale 440 is provided next to the image 410 to provide a visual indication of the measured temperature of different visible parts of the building.

In a typical domestic building, the internal temperature is maintained at around 20° C. If the building is well insulated, a temperature difference of 8° C. or more can be maintained across the walls and roof of the building. Provided the external ambient temperature is 12° C. or less, for example as measured by the temperature sensor 140 (FIG. 1), inadequate insulation can be determined by detecting areas of a building that have a measured temperature of over 12° C. More distinct measurements can be obtained when the external ambient temperature is lower, as this will reveal poor insulation better due to the increased thermal gradient across the walls and rook of the building. If, for example, the external ambient temperature is 5° C., an area of a building determined to have a temperature exceeding this by 7° C. would indicate a need for improved insulation. In order to avoid the influence of solar gain on the external surfaces of the building, measurements should be taken at least 1 hour after sunset.

The location of the house is identified in a location field 420, the address having been determined by cross-referencing information provided by the position sensing unit with an address database. The time the image was taken is also recorded, as shown together with the location field 420. Other information such as the date and the external ambient temperature may also usefully be recorded in the output file 400. The external ambient temperature may also be recorded in the file 400, as this can be used to determine how well insulated the various areas of the building are, by determining a difference between a measured temperature of each area and the ambient temperature.

An information field 430 is also shown in the output file 400, a first part 432 of which provides a checklist for use during a follow-up contact with the householder, and a second part 431 providing general indications of whether insulation is estimated to be required on one or both of the roof and wall of the building. The indications may be in the form of highlighted fields, with the degree of insulation (or lack thereof) being indicated by different colour coding.

FIG. 5 shows a further exemplary output file 500, in this case showing an image 510 of another building at a different address (indicated in the address field 420), the building having a lower degree of insulation on a roof area 511, while having an adequate degree of insulation on the wall area 512. The roof area 511 is identified by having a significantly higher average temperature than the external ambient temperature, as measured by the temperature sensor connected to the computer. An indication is provided in the relevant field 431 to highlight that the roof area requires further insulation.

FIG. 6 shows a yet further exemplary output file 600, in this case showing an image 600 of another building at a different address (indicated in the address field 420), the building having a low degree of insulation on both a roof area 611 and a wall area 612, both of which are identified as having a significantly higher average temperature than the external ambient temperature. The indications provided in the relevant field 431 highlight that both the walls and the roof of the building should have further insulation. In this case, the wall insulation is determined to have poorer insulation, and is therefore highlighted as being of greater importance.

The output files 400, 500, 600 shown in FIGS. 4-6 are in a form suitable for further use by surveyors, who can use the information provided to identify areas of the buildings in question for further analysis. The invention thereby provides a useful tool for identifying properties that may be substandard in their thermal insulation, so that these properties can be investigated further.

The following provides a detailed description of an embodiment according to the third aspect of the invention, including the processes of image capture, image analysis and the subsequent production of sales lead sheets.

Figure 7:
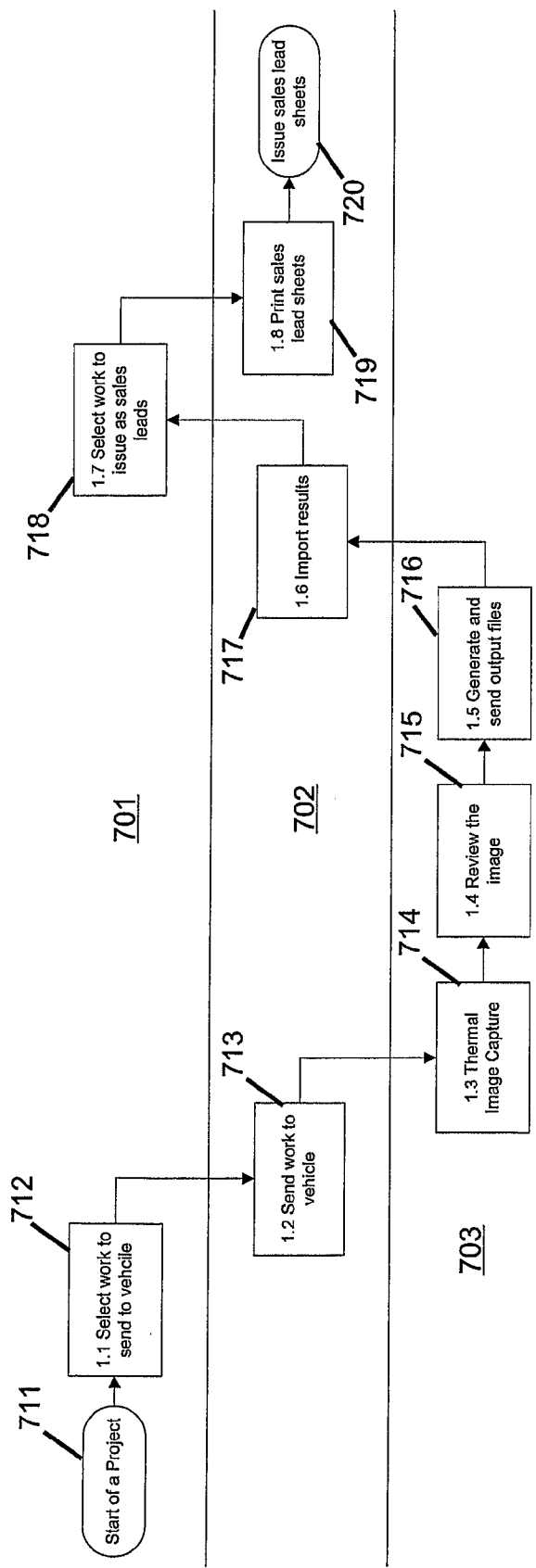
FIG. 7 is a workflow diagram of an exemplary process leading to production of sales sheets.

An outline view of an overall work process, from the start of an individual work project and leading up to the creation of sales lead sheets, is shown schematically in the work flow diagram in FIG. 7. The work flow is divided into three areas: a first area 701 corresponds to parts of the method relating to map information; a second area 702 corresponds to parts of the process relating to a database specific to the method; and a third area 703 corresponds to steps of the method carried out at the image acquisition location. The process starts (step 711) with work being selected for being sent to a vehicle (step 712), and ends (step 720) with the production of sales lead sheets. The various steps between these start and end points are described below in more detail. These steps are described in relation to an exemplary embodiment of the invention involving automatic image acquisition being carried out by means of a computerised system installed onboard a vehicle.

The method begins with work being selected (step 712) for being sent to the vehicle, with the aim of producing sales lead information for a particular geographic area. An address database, for example the in the form of the UK Ordnance Survey Address Point-Reference (OSAPR) database, may be used to derive addresses and corresponding geographic location data based on a chosen area. The chosen area may be selected based on the number of properties within a particular area, or on other factors such as electoral wards or district boroughs. The area may be further broken down into manageable numbers of properties that can realistically be covered in one journey.

Addresses may be selected using one or more of many possible criteria, including by Local Authority boundary and/or electoral Ward. This allows work packages to be managed as individual projects for individual Local Authorities.

The work package is prepared and sent to the vehicle (step 713). To prepare the work package, a series of identifiers corresponding to geographic locations of properties within the selected area (known in the context of OSAPR as address points) is derived from the address database. These address points define accurately positioned locations that are guaranteed to coincide with one or more individual properties having an address at that location. Typically one address point will have one corresponding address. In the case of apartments, however, more than one address may coincide with one address point.

Each address point in the selected area is matched against a list of addresses, and an output file created, comprising the following information:

OSAPR (address point reference)
Coordinates (Easting and Northing)
House Number/Name
Street
Post code An example of such an output file is shown in table 1 below. In this exemplary data file, (the details of which are fictitious and do not relate to actual address details) the first field is the address point reference, which in this case is in the OSAPR format (indicated by the first two characters: AP). Each address point reference is unique for a particular postal address, and can therefore be used as a database reference point for subsequent processing and data retrieval. The second and third fields are the easting and northing references for the address point. In table 1, these references are given at their maximum accuracy, which corresponds to a co-ordinate resolution of 0.1 m. The remaining fields are the house number (or name), the street name and the post code for the address.

TABLE 1

Example address point data file

APLCM1545KY4P3V02C,459738.4,142343.6,31,Chandlers Croft,GP10 5PH
APECM1545KG4P3VG2C,459750.9,142344.7,32,Chandlers Croft,GF10 5PH
AP813M4C5KX5P430FC,459716.0,142386.1,4,Chandlers Croft,GF10 5PH TABLE 1-continued Example address point data file APGJM1445KV4P3V02C,459710.9,142370.2,5,Chandlers Croft,GF10 5PH
AP2N3M4C5KX5P33GFC,459713.2,142364.9,6,Chandlers Croft,GF10 5PH
APTKM1445KV4P3V02C,459692.8,142358.1,7,Chandlers Croft,GF10 5PH
APGJ3M4C5KV5P330PC,459688.5,142355.9,8,Chandlers Croft,GF10 5PH
AP4V3M4C5KV5P33GFC,459681.7,142376.7,9,Chandlers Croft,GF10 5PH
APTXM1545KJ4P6VG2C,459789.4,142572.7,1,Grebe Road,GF10 5PJ
AP6EM1545KU4P6VG2C,459666.7,142540.8,15,Grebe Road,GF10 5PJ
APJGM1545KU4P6V02C,459673.4,142543.9,16,Grebe Road,GF10 5PJ
APAPM1545KW4P6VG2C,459700.8,142558.7,17,Grebe Road,GF10 5PJ
APJQM1545KW4P6VG2C,459705.4,142561.3,18,Grebe Road,GF10 5PJ Sending the work package, for example in the form of the text file of table 1, may be achieved by many different means, including by way of a physical data carrier (e.g. a disk), but more preferably is carried out while the vehicle is remote from the server location. The work package, which can be in the form of a text file, can be sent by electronic means, for example by email or another type of Internet transmission over a wireless network, to a receiver on the vehicle. Wireless networks may, for example, include digital cellular networks such as those based on GPRS, 3G or HSDPA systems. Alternative networks may include wireless access to the internet via IEEE 802.11x systems.

Once sent to the vehicle, the text file constitutes the target properties for the vehicle to visit and acquire images of. The file is automatically imported into a database onboard the vehicle, and a route is planned to cover as many of the properties identified in the file as possible. The route may alternatively be planned beforehand and sent with, or separately from, the work package file.

The work package file is preferably in text (.txt) format. Text files are small in terms of data transmission and storage, and are generic in nature, which allows the files to be used in conjunction with many other applications.

Downloading the work package, for example via GPRS, allows the vehicle to pick up work wherever it is located. Work schedules can be imported automatically, so that the user (the vehicle driver and/or system operator) does not have to manually import the work but instead can concentrate on gathering the information required by travelling around the selected area.

Figure 8:
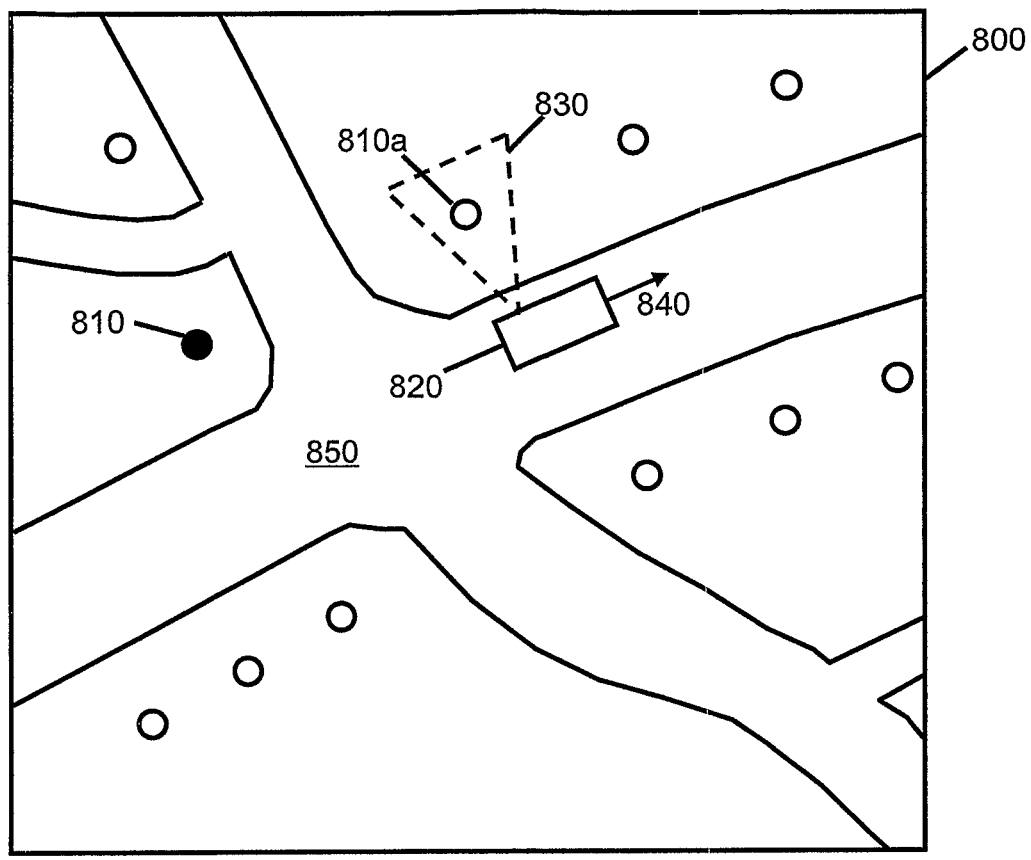
FIG. 8 is a schematic exemplary map display illustrating automatic image acquisition.

A computer system is installed on board the vehicle to capture thermal images of properties in the selected area. The computer system may also be used by the vehicle operator to visually navigate around the area, and to determine which properties have been imaged and which have yet to be imaged. Part of the in-vehicle software may utilise a feature to allow the location information from the work package data file, together with information derived from the geographic location and orientation of the vehicle, to visualise the vehicle in relation to properties to be imaged. One possible way of doing this is through use of a software tool such a Map Server (further information for which is available from the internet at mapserver.org). Each OSAPR is plotted on a map using the easting and northing coordinates from the work package data file, and displayed on the map. An exemplary map display is illustrated in FIG. 8. The address locations are indicated as markers 810 on a visual map display 800. A representation of the vehicle 820 is shown on the display 800, and a camera search area 830 is illustrated extending from a side of the vehicle 820, within which one of the address locations 820a is located.

Using the in-vehicle software, a user can use pan and zoom functions to navigate around the map display, to view the locations corresponding to the addresses in the work package data file. Because each target OSAPR is displayed visually in a map context, the user can easily navigate around an area while capturing images of target properties, without having to manually operate the camera installed aboard the vehicle.

A geographic location system such as GPS (Global Positioning System) can be used to track the vehicle's location. A preferred system is based on DGPS (Differential GPS), which allows for a location accuracy of 0.1 m, corresponding to the positional accuracy of the OSAPR data. A DGPS unit may be mounted on the roof of the vehicle, and information from the unit fed continuously to the computer system to allow the vehicle position to be accurately captured during acquisition. The position of the vehicle is preferably also updated between location measurements according to the last known location and a calculated velocity vector (shown as arrow 840 in FIG. 8). The position and orientation of the vehicle 820 can thereby be accurately located on the map display 800 at any given time, providing feedback that assists the user in directing the vehicle to the required locations.

A camera search area 830 is defined by the computer system, the area 830 being defined in terms of at least two dimensions, corresponding to the area dimensions of the field of view of the camera installed onboard the vehicle 820. The camera search area, which can also be displayed on the map display 800, is linked to the vehicle location through the known relationship between the location of the camera and geographic position sensing unit, and the size and orientation of the vehicle 820. As the vehicle 820 travels along a road, the map display 800 is updated to reflect the new location of the vehicle 820 and the camera search area 830. The camera search area 830 can be adjusted by the user to alter the relative location of the camera on the vehicle and the area covered. The vehicle shape and position can also be adjusted, depending on the relative location of the geographic position sensing unit and the particular vehicle used. Other camera search area shapes may be defined depending on the particular field of view of the camera onboard the vehicle 820.

The user may, for example, wish to adjust the camera search area 830 in order to capture images of properties that may have been missed. This decision can be partly based on the visual information provided by the dynamic map 800 shown within the vehicle 820 with regard to the location of particular properties and their distance from the road 850 along which the vehicle 820 is travelling. The distance from the vehicle can be adjusted along with the camera parameters (for example a preset level of zoom) as and when the user redefines the camera search area within the software.

When using a thermal camera, a temperature parameter in the camera is also preferably set by means of the onboard computer, for example through PXI (PCI eXtensions for Instrumentation: a well-known modular instrumentation platform).

When the computer system is set to an acquisition mode, the camera search area 830 is repeatedly scanned by the system for any properties falling within the search area 830, by comparing the locations of the markers 810 on the map display with the current known camera search area 830. This scanning can be carried out without the need to show the updated map display 800, but the map display is preferably updated at the same time. Each time a property enters the camera search area 830, triggered by the coordinates of an OSAPR on the work schedule data file falling within the geometric area defined by the camera search area derived from the vehicle location, the onboard camera is triggered to capture an image. More than one image may be captured, to allow selection of a best image later on in the process. Images may be captured in .FFF format, and transferred from the camera to a storage medium such as a hard disk of the computer system onboard the vehicle via a high speed connection such as a FireWire (IEEE 1394) USB or wireless connection.

Each image is saved with a unique ID, which preferably includes the OSAPR corresponding to the property being imaged. Other information is also preferably captured and stored at the same time, such as one or more of the following:
Date (image taken);
Time (image taken);
External temperature;
Vehicle speed;
GPS data quality;
Distance from property;
Vehicle coordinates (Easting and Northing);
Driver and/or operator information/identity;

A typical implementation of the computerised system using current known technology allows for images of properties along a street to be imaged at up to 20 mph. For an average density of properties, this would typically result in such a system being able to survey up to 1,000 properties per hour. This is, of course, many more than would be expected to be achieved through manual methods of image acquisition.

As each image is acquired, the map display 800 (FIG. 8) is preferably updated to indicate that the property at the corresponding location has been imaged, for example by changing a characteristic of the location marker 810 on the display 800. This is indicated in FIG. 8, where markers corresponding to properties yet to be imaged (or about to be imaged) are indicated as hollow circles, while other markers 810 corresponding to properties that have been imaged are indicated as filled circles. Other indications such as a change of colour, shape or size of the marker may be used. This allows the user to readily view those locations where images have yet to be acquired, so that a revised route can be planned as necessary.

Each image taken is preferably labelled with at least the corresponding OSAPR. This allows for images to be retrospectively matched back to an address, even if stored without any further information. Other information stored with the image can allow for the conditions under which each image was taken to be taken into account, for example in downstream quality control analysis.

Once an image has been acquired (step 714, FIG. 7), further processing can be carried out to analyse any information in the image that may be used in determining whether the property imaged is in need of further thermal insulation. This analysis may be carried out by an operator onboard the vehicle, or may be carried out offline after all the images in a particular area have been acquired. Each image is first converted to a format suitable for the computer system to modify further and store after processing. A file containing the image is displayed, which a user can review and adjust in terms of level and span in order to allow a determination to be made as to whether the imaged property requires insulation (step 715, FIG. 7). When reviewing the images, the user can adjust the level and the span of the thermal image before deciding whether the property would benefit from insulation improvements.

The type of insulation may for example be a choice of loft or cavity wall insulation, depending on the areas identified in the image. The user then indicates whether the property needs loft insulation, cavity insulation (or both), whether the property appears to be adequately insulated or whether a determination cannot be made due to the quality of this image. Each of these possible outcomes is assigned a code, which is then used in preparing sales lead sheets.

Once the images have been reviewed a results file is generated. The results file may comprise the following information:
OSAPR;
Result (Thermal Survey Result);
Date (image taken);
Time (image taken;
External temperature;
Vehicle speed;
GPS per (quality);
Distance from property;
Vehicle coordinates (Easting and Northing);
Date (image was reviewed);
Time (image was reviewed);
The Driver;
The Technician;
The results batch ID;

An exemplary results file is shown in Table 2 below (the data in which, as for table 1, is fictitious). The results are in the form of comma-delimited rows containing information corresponding to the list of information indicated above. For example, the first set of data in the file indicates an OSAPR of AP100E535K04CNWG0J (being the name of the associated image file), a result code of 11, the image being acquired on Dec. 3, 2009 at 21:58:28, while the external temperature was measured to be 13° C., the vehicle was travelling at 8 mph, the GPS quality was 2, the distance to the building was 10 m, the vehicle coordinates were 320514,316725.5, the image was reviewed on Mar. 17, 2009 at 22:12:24, the driver code was 05DL, the technician code was 06GG, and the results batch ID was AF100015. Any or all of this data can be used in subsequent processing.

TABLE 2

Example results file after image acquisition

AP100E535K04CNWG0J,11,12/03/2009 21:58:28,13,8,2,10,320514,316725.5,17/03/2009 22:12:24,05DL,06GG,AF100015
AP10335Y5WP4GJXGPC,3,06/02/2009 22:11:38,10,−2,2,5,328420.9,316784.7,17/03/2009 21:39:26,05DL,06GG,AF100015
AP10335Y5WY4GGX0NC,3,06/02/2009 22:14:49,11,−2,2,5,328304.1,316647.2,17/03/2009 21:40:35,05DL,06GG,AF100015

TABLE 2-continued

Example results file after image acquisition

AP10HD5E5LA4C6Q0QA,3,16/03/2009 23:08:51,4,8,2,10,321533.2,317135.4,17/03/2009 23:03:33,05DL,06GG,AF100015
AP10HD5X5L84C6Q0PA,3,16/03/2009 23:09:00,10,8,2,11,321535.6,317107.3,17/03/2009 23:03:36,05DL,06GG,AF100015
AP10HD5X5L94C6QGPA,3,16/03/2009 23:08:56,8,8,2,11,321535.6,317123.9,17/03/2009 23:03:36,05DL,06GG,AF100015
AP10HE5X5JN4CLQGTA,3,12/03/2009 21:56:43,6,8,2,10,320373.6,316578.6,17/03/2009 22:11:11,05DL,06GG,AF100015
AP10HE5X5K14CTQ0DA,3,12/03/2009 21:49:14,12,8,2,12,320745.3,316749.4,17/03/2009 22:08:10,05DL,06GG,AF100015
AP10HE5X5KE4CRQG1A,3,12/03/2009 21:53:26,17,8,2,13,320699.7,316671.6,17/03/2009 22:09:40,05DL,06GG,AF100015
AP10HF5X5LF4CTQG5A,3,12/03/2009 22:24:25,13,8,2,11,320773.3,337215.5,17/03/2009 22:23:53,05DL,06GG,AF100015
AP11335F5WK4GHX0PC,3,06/02/2009 22:09:22,10,-2,2,8,328369.7,316708.1,17/03/2009 21:36:08,05DL,06GG,AF100015
AP11335F5WU4FFXGPC,3,06/02/2009 21:57:04,13,-2,2,5,328240.7,316583,17/03/2009 21:32:29,05DL,06GG,AF100015
AP11335F5X24FEXGNC,3,06/02/2009 23:17:00,17,-2,2,8,328188.8,316953.7,17/03/2009 21:58:40,05DL,06GG,AF100015

The output files from the review process are then imported to a central database (step 717, FIG. 7), for example by transmitting the results from the vehicle back to a central server, or alternatively by uploading from a storage medium containing the data obtained after a work schedule has been carried out. These results are preferably sent in a secure format, for example on an encrypted USB memory stick, or sent via a secure communications link. The memory stick can be sent to a central location for secure storage and backup purposes.

From the analysis already carried out (at step 715), a sample of the properties covered in which some insulation was seen to be required is selected (step 718). The step may involve a reference being made to the central database, for example to retrieve address details. Individual sales lead sheets are then prepared (step 719) from this sample, and issued for further use (step 720). FIGS. 5 and 6 illustrate examples of the type of sales lead sheets that may result from the process.

Positively marked images stored in the database (i.e. those for which properties have been identified as requiring further insulation) can be queried spatially in order to allocate leads to sales teams. Once the selection has been made, the selection is exported to the central database (step 717). This enables a separate sales team to be fed with accurate, and up to date, information including an individual property's indicated insulation requirements.

Various aspects of the process may be reported via a website, for example for internal use to track the progress of various vehicles acquiring images or for external use to allow clients to view selected areas where image acquisition and analysis has been carried out. Thermal images of each property within a particular area, for example for a given local authority, may also be made available, preferably via a secure website. Clients can thereby advantageously be kept up to date with accurate information, even in real time as image acquisition is being carried out.

Other embodiments are intentionally within the scope of the invention as defined by the appended claims.

The invention claimed is:

1. A computerised method of automatically acquiring a series of thermal images, the method comprising the steps of:
   i) processing a data file containing a series of identifiers, each identifier corresponding to a geographic location of a building;
   ii) receiving location data from a geographic position sensing unit;
   iii) defining a camera search area defined by the location data and a location of a camera relative to the position sensing unit;
   iv) providing a map display representing a geographic area comprising the location of the geographic position sensing unit and one or more location markers representing buildings having a corresponding identifier in the data file, the map display being continually updated with a current location of the position sensing unit;
   v) displaying an indicator of the camera search area on the map display, wherein the indicator is used to identify locations on the map display that correspond to actual locations at which the camera is pointing at a current time;
   vi) repeatedly scanning the camera search area for any buildings falling within the camera search area by comparing the geographic locations of the series of identifiers with the camera search area; and
   vii) acquiring a thermal image of a building with the camera when a geographic location of the building corresponding to one of the series of identifiers is within the camera search area.

2. The method of claim 1 wherein steps ii) to vi) are automatically repeated so as to acquire thermal images of a plurality of buildings having corresponding identifiers in the data file.

3. The method of claim 1 comprising storing each acquired thermal image with a unique identifier, the unique identifier being one of the series of identifiers in the received data file.

4. The method of claim 3 wherein additional information is stored with each acquired thermal image, the additional information including one or more of: the date the thermal image was acquired, the time the thermal image was acquired, the temperature of the external environment, the geographic location of the vehicle, the speed of travel of the geographic position sensing unit, a quality level of the location data received when acquiring the thermal image, a distance from the camera to the building, the date or time the thermal image was reviewed and adjusted by a user, an identifier corresponding to a driver of a vehicle in which the camera is installed or to an operator of the system and a batch identifier of the data file.

5. The method of claim 1 wherein the method is performed on a computerised system installed onboard a vehicle on which the camera and geographic position sensing unit are installed.

6. The method of claim 5 wherein the data file is received from a server at a location remote from the vehicle.

7. The method of claim 6 wherein acquired thermal images are transmitted to a remote server during or after acquisition of thermal images of buildings having locations corresponding to identifiers in the received data file.

8. The method of claim 5 wherein the thermal images, and any optional additional information, are stored locally to the vehicle.

9. The method of claim 5 wherein the camera search area is defined at least in terms of a distance from the camera and a maximum field of view of the camera.

10. The method of claim 9 wherein the maximum field of view is defined as a linear dimension of an area having the maximum distance as another dimension.

11. The method of claim 9 wherein the camera search area is in the form of a triangle having a height equal to the maximum distance from the camera and a base width equal to a maximum field of view of the camera, with the apex of the triangle located at the camera.

12. The method of claim 1 wherein a visual appearance of a location marker on the map display is automatically altered when an image is acquired of a corresponding building.

13. A vehicle comprising a thermal image acquisition system, the thermal image acquisition system comprising a computer, a camera and a geographic position sensing unit,
wherein the computer is configured to perform the method according to claim 1 by receiving and processing the data file, continually receiving location data from the geographic position sensing unit, defining the camera search area based on the location data, repeatedly scanning the camera search area for any buildings falling within the camera search area by comparing the geographic locations of the series of identifiers with the camera search area and controlling the camera to acquire a thermal image when a geographic location of a building corresponds to one of the series of identifiers falling within the camera search area.

14. The vehicle of claim 13 comprising a first left-facing thermal imaging camera and a second right-facing thermal imaging camera, each camera being connected to the computer for providing thermal images of buildings on the left and right of the vehicle respectively.

15. The vehicle of claim 13 wherein the computer is configured to automatically acquire and process thermal images of a plurality of buildings while the vehicle is in motion.

16. A computer program product comprising a tangible, non-transitory computer-readable medium having stored thereon instructions which when executed by a computer cause the computer to perform a computerised method of automatically acquiring a series of thermal images, the method comprising the steps of:
   i) processing a data file containing a series of identifiers, each identifier corresponding to a geographic location of a building;
   ii) receiving location data from a geographic position sensing unit;
   iii) defining a camera search area defined by the location data and a location of a camera relative to the position sensing unit;
   iv) providing a map display representing a geographic area comprising the location of the geographic position sensing unit and one or more location markers representing buildings having a corresponding identifier in the data file, the map display being continually updated with a current location of the position sensing unit;
   v) displaying an indicator of the camera search area on the map display, wherein the indicator is used to identify locations on the map display that correspond to actual locations at which the camera is pointing at a current time;
   vi) repeatedly scanning the camera search area for any buildings falling within the camera search area by comparing the geographic locations of the series of identifiers with the camera search area; and
   vii) acquiring a thermal image of a building with the camera when a geographic location of the building corresponding to one of the series of identifiers is within the camera search area.

17. The method of claim 1, wherein:
the thermal image of the building is acquired when it is detected that the geographic location of the building corresponding to one of the series of identifiers is identified by a location marker of one or more location markers within the indicator of the camera search area displayed on the display map.

* * * * *